US012280603B2

(12) United States Patent
Nishihara et al.

(10) Patent No.: US 12,280,603 B2
(45) Date of Patent: Apr. 22, 2025

(54) PRINTING APPARATUS, PRINTING METHOD, AND NON-TRANSITORY COMPUTER-READABLE STORAGE MEDIUM

(71) Applicant: BROTHER KOGYO KABUSHIKI KAISHA, Nagoya (JP)

(72) Inventors: Keisuke Nishihara, Nagoya (JP); Akira Minami, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 188 days.

(21) Appl. No.: 18/305,328

(22) Filed: Apr. 22, 2023

(65) Prior Publication Data

US 2023/0347659 A1 Nov. 2, 2023

(30) Foreign Application Priority Data

Apr. 27, 2022 (JP) ................................ 2022-073044

(51) Int. Cl.
*B41J 2/335* (2006.01)
*B41J 2/525* (2006.01)

(52) U.S. Cl.
CPC ............ *B41J 2/3352* (2013.01); *B41J 2/525* (2013.01)

(58) Field of Classification Search
CPC ... B41J 2/3352; B41J 2/525; B41J 2/32; B41J 2/36; B41J 35/16; B41J 35/18; B41J 2002/0052; B41F 16/00; B41F 16/0006
See application file for complete search history.

(56) References Cited

U.S. PATENT DOCUMENTS

| | | | | |
|---|---|---|---|---|
| 2020/0016905 A1* | 1/2020 | Tsuchiya | ................ | B41J 2/3558 |
| 2021/0141328 A1 | 5/2021 | Sasaki et al. | | |

FOREIGN PATENT DOCUMENTS

| | | | | | |
|---|---|---|---|---|---|
| JP | 2008-6830 | A | 1/2008 | | |
| JP | 2019-214206 | A | 12/2019 | | |
| JP | 2021041710 | * | 3/2021 | ............. | B41J 2/315 |
| WO | 02/096665 | A1 | 12/2002 | | |
| WO | WO2021153682 | * | 8/2021 | ............. | B41J 2/355 |

* cited by examiner

*Primary Examiner* — Kristal Feggins
(74) *Attorney, Agent, or Firm* — KENEALY VAIDYA LLP

(57) ABSTRACT

A CPU of a printing apparatus energizes heat-generating elements for a predetermined period of time in a first divided printing cycle of two divided printing cycles obtained by dividing one printing cycle, according to a yellow energization pattern, and forms a first yellow print dot without causing a heat-sensitive tape to develop another color. Then, the CPU energizes the heat-generating elements for a predetermined period of time in a second divided printing cycle of the two divided printing cycles, and forms a second yellow print dot on the heat-sensitive tape. By forming two print dots in one printing cycle, the CPU secures a large color reproduction range.

8 Claims, 6 Drawing Sheets

PRINTING APPARATUS, PRINTING METHOD, AND NON-TRANSITORY COMPUTER-READABLE STORAGE MEDIUM

REFERENCE TO RELATED APPLICATIONS

This application claims priority from Japanese Patent Application No. 2022-073044 filed on Apr. 27, 2022. The entire content of the priority application is incorporated herein by reference.

BACKGROUND ART

There is a printing apparatus configured to perform printing on a print medium in which a plurality of color development layers for developing different colors are formed on a base material. For example, an image forming apparatus applies energy from a print head to a print medium having three color development layers having different color development characteristics, and controls a temperature and a period of the print head at that time, thereby forming an image on a desired color development layer. In the image forming apparatus, the period for applying heat is controlled in a range of about 0.001 to about 100 milliseconds for each line of an image. It is necessary to use a high-performance CPU for the control, and to heat the color development layers with an expensive print head with high heat responsiveness.

However, when performing printing on a print medium having a plurality of color development layers by using a general-purpose CPU and an inexpensive print head having a large heat capacity, it is difficult to maintain a constant temperature of the print head, and it is also difficult to maintain a high temperature. Therefore, it is difficult to form a large print dot, so that a reproduction range of the print dot becomes small.

DESCRIPTION

An object of the present disclosure is to provide a printing apparatus, a printing method, and a non-transitory computer-readable storage medium storing a printing program capable of increasing a reproduction range of a print dot.

According to a first aspect of the present disclosure, there is provided a printing apparatus including: a thermal head having a plurality of heat-generating elements aligned in a line form; a conveyor configured to convey a print medium in a conveying direction orthogonal to a serial direction in which the plurality of heat-generating elements are aligned in the terminal head, the printing apparatus being configured to form print dots on the print medium conveyed by the conveyor; a processor configured to: generate a signal pattern for causing the plurality of heat-generating elements to selectively generate heat based on image data; and control an application of energy to the heat-generating elements according to the signal pattern, for each printing cycle that is repeated continuously, in which the signal pattern is configured by a pattern in which application information of indicating a period for applying energy to the heat-generating elements and non-application information of indicating a period not for applying energy to the heat-generating elements are combined, and in which the processor is configured to generate the signal pattern by a combination of: a multi-dot forming signal pattern including a pattern in which one printing cycle is divided into a plurality of divided printing cycles, and a print dot is formed by a combination of the application information and the non-application information in each of the divided printing cycles; and a single-dot forming signal pattern that is a pattern in which a single print dot is formed by a combination of the application information and the non-application information within one printing cycle, without dividing the one printing cycle.

The printing apparatus can form a plurality of print dots in one printing cycle according to the multi-dot forming signal pattern. That is, even though a single print dot is small, the printing apparatus can secure a sufficiently large reproduction range of a print dot by forming a plurality of print dots within a range in which a print dot can be formed in one printing cycle.

In the first aspect, the multi-dot forming signal pattern may include: a first pattern by a combination of the application information and the non-application information in a first divided printing cycle that is one of the plurality of divided printing cycles; and a second pattern by a combination of the application information and the non-application information in a second divided printing cycle subsequent to the first divided printing cycle, and alignments of the application information may be different between the first pattern and the second pattern. When forming a plurality of print dots according to the multi-dot forming signal pattern, the thermal head is more affected by heat storage in the heat-generating elements as the number of divided printing cycles increases. In this case, the thermal head may apply a more amount of heat than necessary to a print medium in the second divided printing cycle, and therefore, a color tone of the print dot may change. Therefore, in the multi-dot forming signal pattern, a print dot forming pattern in the first divided printing cycle and a print dot forming pattern in the second divided printing cycle are made different, so that the printing apparatus can improve a color tone of the print dot.

In the first aspect, a first amount of energy applied to the heat-generating elements according to the multi-dot forming signal pattern may be different from a second energy applied to the heat-generating elements according to the single-dot forming signal pattern, and a color of a print dot formed on the print medium due to the first amount of energy is different from a color of a print dot formed on the print medium due to the second amount of energy. The printing apparatus can form print dots of different colors on the print medium by applying the energy to the heat-generating elements according to the multi-dot forming signal pattern and the single-dot forming signal pattern.

In the first aspect, the print medium may include a base material and a plurality of color development layers having visible light transmittance, the plurality of color development layers may include a first color development layer provided on one side in a thickness direction of the base material and configured to develop a first color by being heated to a temperature exceeding a predetermined first temperature, and a second color development layer provided between the base material and the first color development layer and configured to develop a second color by being heated to a temperature exceeding a second temperature lower than the first temperature, the thermal head may be configured to perform printing on the print medium from the one side in the thickness direction, and the multi-dot forming signal pattern may be used in a case of forming print dots of the first color by causing at least the first color development layer singly to develop a color. In order to cause the first color development layer singly to develop the first color without causing the second color development layer to develop a color, the printing apparatus needs to heat the print medium at a high temperature and for a short period of time, and therefore, it is difficult to form a large print dot. In this case, the printing apparatus forms a plurality of print dots of the first color according to the multi-dot forming signal pattern in one printing cycle. Therefore, even though a single print dot is small, the printing apparatus can secure a sufficiently large reproduction range of the first color by forming a plurality of print dots.

In the first aspect, the plurality of color development layers may further include a third color development layer provided between the base material and the second color development layer and configured to develop a third color by being heated to a temperature exceeding a third temperature lower than the second temperature. Since the print medium includes three color development layers, the printing apparatus can perform more colorful color expressions on the print medium by combining the three colors. In this case, by using the multi-dot forming signal pattern or the single-dot forming signal pattern, the printing apparatus can easily control the heating for each color development layer, and form print dots developed into appropriate colors on the print medium.

In the first aspect, the first color may be yellow, the second color may be magenta, and the third color may be cyan, and the multi-dot forming signal pattern may be used in a case of forming print dots of yellow, print dots of magenta, or print dots of red being a mixed color of yellow and magenta. Yellow and magenta develop colors in a shorter period of time than cyan. Therefore, by using the multi-dot forming signal pattern, the printing apparatus can cause the target color development layer singly to develop a color, and form yellow, magenta, and red print dots, for which sufficiently large color reproduction ranges are secured, on the print medium.

According to a second aspect of the present disclosure, there is provided a printing method of, in a printing apparatus including a thermal head having a plurality of heat-generating elements aligned in a line form, and a conveyor configured to convey a print medium in a conveying direction orthogonal to a serial direction in which the plurality of heat-generating elements are aligned in the thermal head, forming print dots on the print medium conveyed by the conveyor, the printing method having the steps of: generating a signal pattern for causing the plurality of heat-generating elements to selectively generate heat based on image data; and controlling an application of energy to the heat-generating elements according to the signal pattern, for each printing cycle that is repeated continuously, to form print dots on the print medium, in which the signal pattern is configured by a pattern in which application information of indicating a period for applying energy to the heat-generating elements and non-application information of indicating a period not for applying energy to the heat-generating elements are combined, and in which the signal pattern is configured by a combination of: a multi-dot forming signal pattern including a pattern in which one printing cycle is divided into a plurality of divided printing cycles, and a print dot is formed by a combination of the application information and the non-application information in each of the divided printing cycles; and a single-dot forming signal pattern that is a pattern in which a single print dot is formed by a combination of the application information and the non-application information within one printing cycle, without dividing the one printing cycle. Therefore, the second aspect exhibits the similar effects to those of the first aspect.

According to a third aspect of the present disclosure, there is provided a non-transitory computer-readable storage medium storing a printing program executable by a computer of a printing apparatus that includes a thermal head having a plurality of heat-generating elements aligned in a line form, and a conveyor configured to convey a print medium in a conveying direction orthogonal to a serial direction in which the plurality of heat-generating elements are aligned in the thermal head, the printing apparatus being configured to form print dots on the print medium conveyed by the conveyor, the printing program comprising instructions that, when executed by the computer, cause the printing apparatus to perform: generating a signal pattern for causing the plurality of heat-generating elements to selectively generate heat based on image data; and controlling an application of energy to the heat-generating elements according to the signal pattern, for each printing cycle that is repeated continuously, to form print dots on the print medium, in which the signal pattern is configured by a pattern in which application information of indicating a period for applying energy to the heat-generating elements and non-application information of indicating a period not for applying energy to the heat-generating elements are combined, and in which the signal pattern is configured by a combination of: a multi-dot forming signal pattern including a pattern in which one printing cycle is divided into a plurality of divided printing cycles, and a print dot is formed by a combination of the application information and the non-application information in each of the divided printing cycles; and a single-dot forming signal pattern that is a pattern in which a single print dot is formed by a combination of the application information and the non-application information within one printing cycle, without dividing the one printing cycle. Therefore, the third aspect exhibits the similar effects to those of the first aspect.

Hereinafter, an embodiment of the present disclosure will be described with reference to the drawings. The drawings that will be referred to are used so as to describe the technical features that can be adopted by the present disclosure, and the configurations and control and the like of the apparatus described below are not intended to be limited thereto but are merely explanatory examples.

A printing apparatus 1 of the present embodiment is a label printer configured to prepare an attachable label by printing a character, a symbol, a figure, an image, etc. on a heat-sensitive tape 9 (refer to FIG. 3), which is a long-length print medium in which a release sheet is attached to one side via an adhesive layer, and cutting the tape. The heat-sensitive tape 9 is accommodated in a cassette (not shown) in a state of being wound into a roll shape, and is mounted to the printing apparatus 1.

Figure 1:
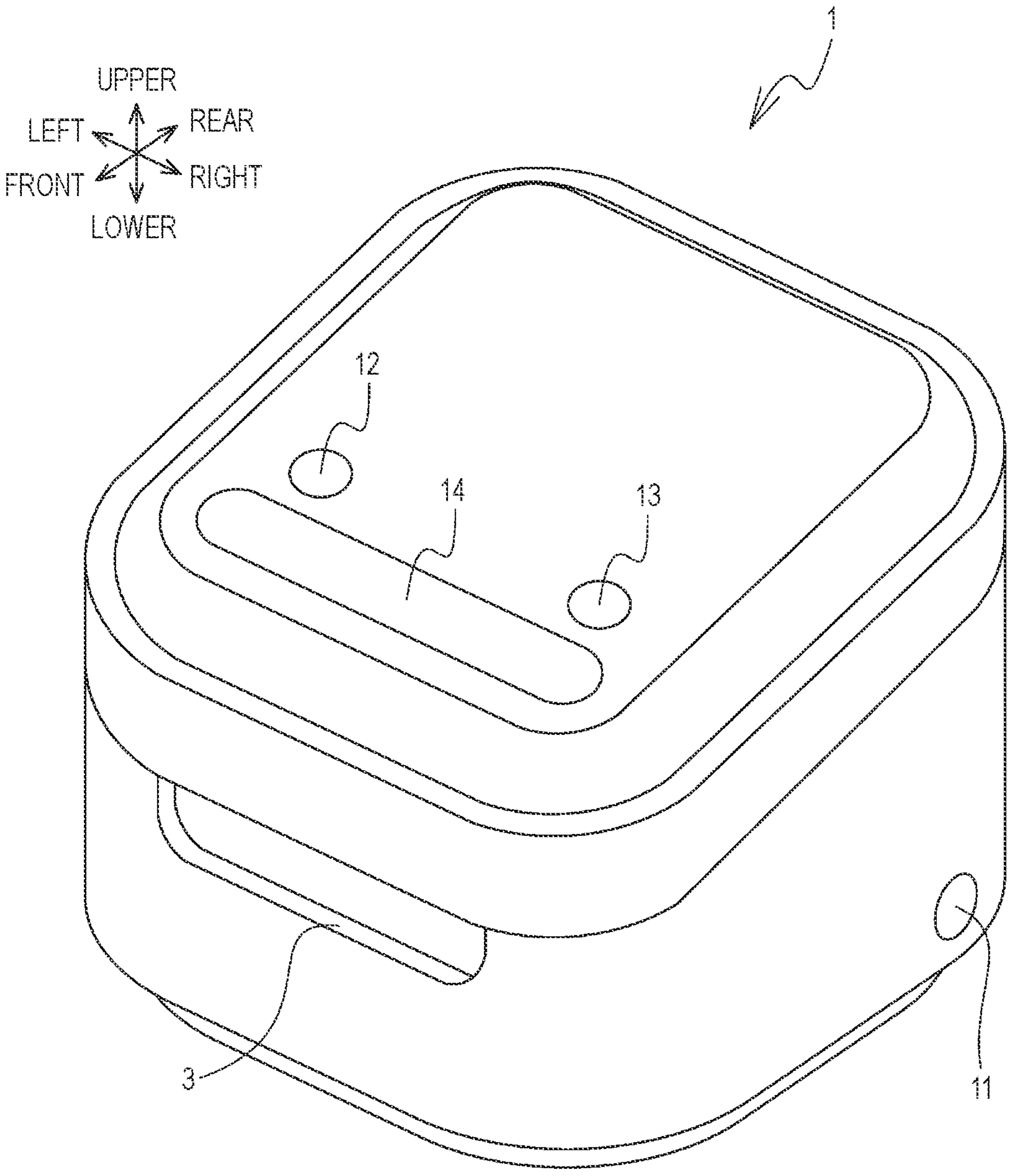
FIG. 1 is a perspective view showing an appearance of a printing apparatus 1.

An outer configuration of the printing apparatus 1 will be described. As shown in FIG. 1, the printing apparatus 1 has a box shape, and a mounting part (not shown) for mounting the cassette of the heat-sensitive tape 9 is provided on a back side. A front side of the printing apparatus 1 is provided with a discharge port 3 for discharging a printed label. A power supply switch 11 is provided on a rear lower part of a right side surface of the printing apparatus 1. An upper surface of the printing apparatus 1 is provided with a connection switch 12 for instructing network connection, a cassette switch 13 for instructing removal of the cassette, and a cutting switch 14 for instructing cutting of the heat-sensitive tape 9. Note that the power switch 11, the connection switch 12, the cassette switch 13, and the cutting switch 14 are also generally referred to as switches 11 to 14.

Figure 2:
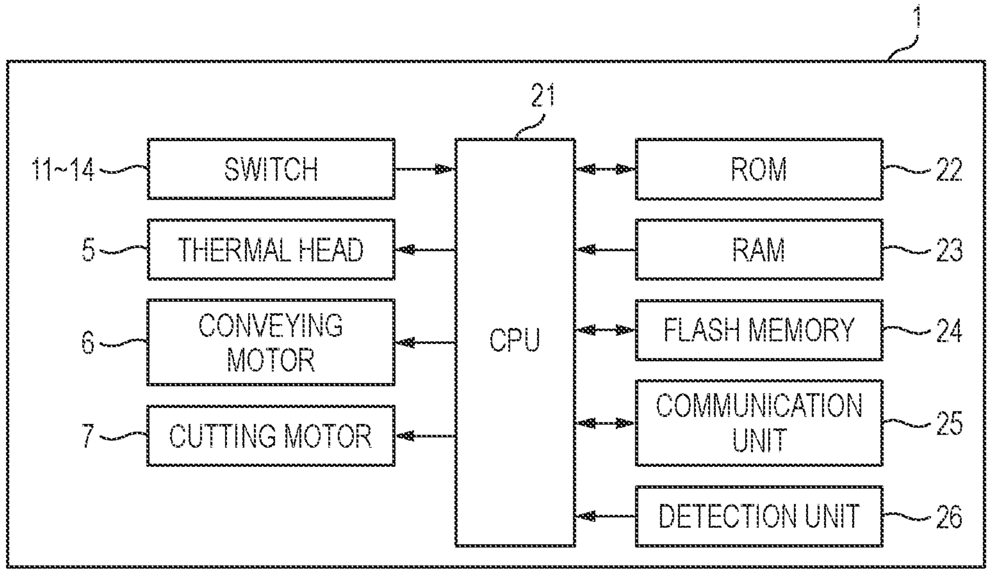
FIG. 2 is a block diagram showing an electrical configuration of the printing apparatus 1.

An electrical configuration of the printing apparatus 1 will be described. As shown in FIG. 2, the printing apparatus 1 includes a CPU 21. The CPU 21 is configured to control the printing apparatus 1 and to function as a processor. A ROM 22, a RAM 23, a flash memory 24, a communication unit 25, a detection unit 26, switches 11 to 14, a thermal head 5, a conveying motor 6, and a cutting motor 7 are electrically connected to the CPU 21.

The ROM 22 is configured to store various parameters necessary for execution of various programs. The RAM 23 is configured to store various temporary data, such as image data corresponding to each pixel area for original image to be printed, and print data generated based on image data for forming an image. The flash memory 24 is configured to store programs to be executed by the CPU 21, information on a cassette, and the like. The communication unit 25 is a well-known wireless LAN interface, and is configured to communicate by connecting to an external terminal (not shown). The communication unit 25 may be a USB interface or a wired LAN interface. The external terminal is, for example, a general-purpose personal computer (PC), a portable terminal, a memory card reading device, or the like.

The detection unit 26 is a known sensor configured to detect a type of the heat-sensitive tape 9 mounted to the printing apparatus 1, based on an identifier provided to the cassette. The switches 11 to 13 are push button-type switches. The power supply switch 11 is operated when a user switches ON/OFF of power supply to the printing apparatus 1. The connection switch 12 is operated by the user when connecting to the network by wireless LAN. The cassette switch 13 is operated by the user when removing the cassette of the heat-sensitive tape 9 mounted to the mounting part. The cutting switch 14 is a touch sensor. The cutting switch 14 is operated when the user cuts the heat-sensitive tape 9 to an arbitrary length.

The thermal head 5 includes a plurality of heat-generating elements (not shown). The heat-generating elements are aligned and arranged in a left-right direction within the printing apparatus 1. The heat-sensitive tape 9 is taken out from the cassette mounted to the mounting part, conveyed from the rear toward the front within the printing apparatus 1, and discharged from the discharge port 3. The plurality of heat-generating elements of the thermal head 5 are aligned in a row in the left-right direction orthogonal to a conveying direction of the heat-sensitive tape 9, and are configured to heat the heat-sensitive tape 9. The conveying motor 6 is configured to rotationally drive a platen roller (not shown) arranged to face the thermal head 5, thereby conveying the heat-sensitive tape 9 in the conveying direction. The cutting motor 7 is configured to drive a cutting blade (not shown) provided near the discharge port 3, thereby cutting the heat-sensitive tape 9 to prepare a label.

Figure 3:
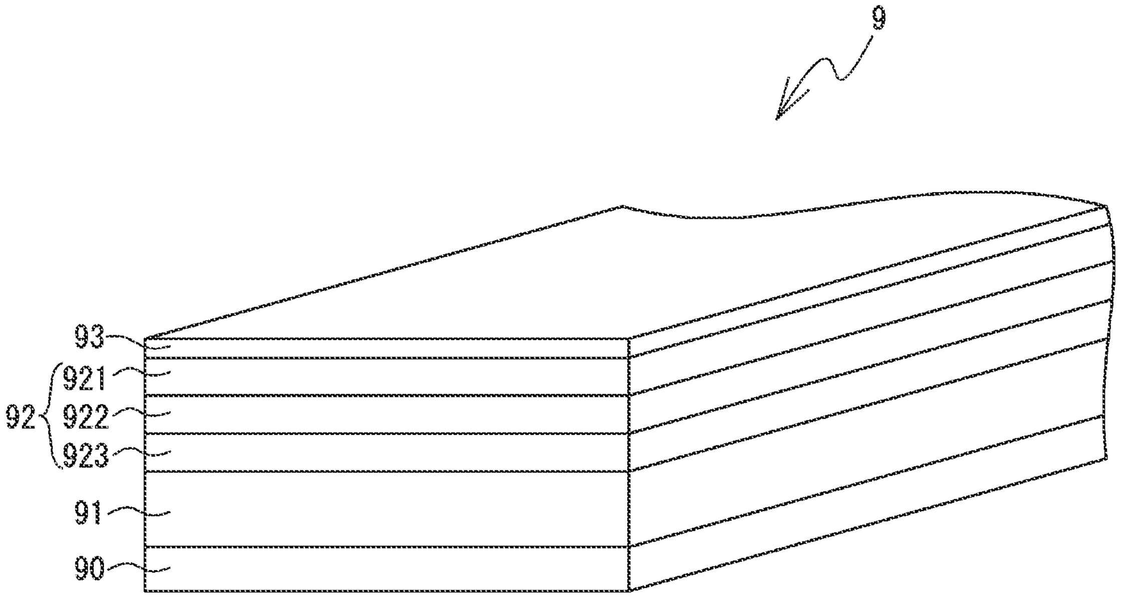
FIG. 3 is a perspective view showing a heat-sensitive tape 9.

A configuration of the heat-sensitive tape 9 will be described. In the following description, the upper and lower sides of FIG. 3 are respectively referred to as the upper and lower sides of each tape. The heat-sensitive tape 9 is a long-length medium and is configured by laminating a plurality of layers. The heat-sensitive tape 9 includes a release sheet 90, a base material 91, a plurality of heat-sensitive layers 92, and an overcoat layer 93 (hereinafter collectively referred to as "each layer of the heat-sensitive tape 9"). In the present embodiment, the plurality of heat-sensitive layers 92 include a first heat-sensitive layer 921, a second heat-sensitive layer 922, and a third heat-sensitive layer 923. The release sheet 90, the base material 91, the third heat-sensitive layer 923, the second heat-sensitive layer 922, the first heat-sensitive layer 921, and the overcoat layer 93 are aligned and laminated in this order in a thickness direction (upper-lower direction in FIG. 3) of the heat-sensitive tape 9 from the lower side of the heat-sensitive tape 9.

The release sheet 90 is provided to be able to contact/separate with respect to a lower surface of the base material 91, and protects an adhesive of the base material 91. By separating the release sheet 90 after printing, the user can stick the label prepared by cutting the heat-sensitive tape 9 to a desired location via the adhesive. The heat-sensitive tape 9 may also be a heat-sensitive sheet with no adhesive applied to a back side of the base material 91.

The base material 91 is a resin film, specifically a non-foamed resin film, and more specifically a non-foamed polyethylene terephthalate (PET) film. That is, an inside of the base material 91 does not contain air bubbles.

Each layer of the plurality of heat-sensitive layers 92 is configured to develop a color corresponding to each layer by being heated to a color development temperature corresponding to each layer. For the formation of the plurality of heat-sensitive layers 92, a chemical described in, for example, JP2008-006830A is used. When the third heat-sensitive layer 923 is heated at a temperature exceeding a third temperature for a third time or longer, it develops a third color having lower visible transmittance than an original state thereof. In the present embodiment, the third color is cyan (hereinafter abbreviated as "C"). When the second heat-sensitive layer 922 is heated at a temperature exceeding a second temperature for a second time or longer, it develops a second color having lower visible transmittance than an original state thereof. The second temperature is higher than the third temperature. The second time is shorter than the third time. In the present embodiment, the second color is magenta (hereinafter abbreviated as "M"). When the first heat-sensitive layer 921 is heated at a temperature exceeding a first temperature for a first time or longer, it develops a first color having lower visible transmittance than an original state thereof. The first temperature is higher than the second temperature. The first time is shorter than the second time. In the present embodiment, the first color is yellow (hereinafter abbreviated as "Y").

As shown in FIG. 3, the overcoat layer 93 is formed in the form of a film by being coated on an upper surface of the first heat-sensitive layer 921, and is configured to transmit blue visible light (for example, light having a wavelength of about 470 nm) more than yellow visible light (for example, light having a wavelength of about 580 nm). That is, the overcoat layer 44 has lower visible light transmittance for yellow than visible light transmittance for blue. The overcoat layer 93 protects the plurality of heat-sensitive layers 92 from a side opposite to the base material 91 (i.e., upper surface side of the heat-sensitive tape 9).

The heat-sensitive tape 9 has visible light transmittance in the thickness direction of the heat-sensitive tape 9, as a whole. That is, all layers of the heat-sensitive tape 9 have visible light transmittance. The visible light transmittance (%) of the base material 91 may be the same as or different from the visible light transmittance of at least one of the plurality of heat-sensitive layers 92 or the overcoat layer 93. The visible light transmittance of each layer of the heat-sensitive tape 9 is, for example, 90% or greater, preferably 99% or greater, and more preferably 99.9% or greater. Even though the visible light transmittance of each layer of the heat-sensitive tape 9 is less than 90%, the visible light transmittance of each layer of the heat-sensitive tape 9 is only necessary to be high for the user to visualize at least colors developed in the heat-sensitive layers 92 through the base material 41. The layers of the heat-sensitive tape 9 are all transparent or translucent, and preferably transparent.

Note that, in FIG. 3, the thickness of each layer of the heat-sensitive tape 9 and the magnitude relationship among the thicknesses of the layers are depicted schematically to facilitate understanding, though the actual layer thicknesses and magnitude relationships among these thicknesses may differ from those shown in FIG. 3. For example, the thickness of the overcoat layer 93 may be greater, the same as or smaller than the thickness of each layer of the plurality of heat-sensitive layers 92.

The color development of the heat-sensitive layer 92 will be described. As described above, when the first heat-sensitive layer 921, the second heat-sensitive layer 922, and the third heat-sensitive layer 923 are heated to the first temperature or higher, the second temperature or higher, and the third temperature or higher, respectively, they develop colors of yellow, magenta and cyan, respectively. The CPU 21 of the printing apparatus 1 is configured to generate print data in which an energization pattern for each print dot to be formed on the heat-sensitive layer 92 is set based on an energization pattern table (refer to FIG. 4), in label preparation processing described later (refer to FIG. 6). In the energization pattern, an energization timing and an energization time to the heat-generating elements of the thermal head 5 are set so as to heat the heat-sensitive layer 92 to a temperature corresponding to a color of each print dot. The heat-generating elements are configured to generate heat when energized and to dissipate heat in a non-energization state. In the heat-sensitive layer 92, the first heat-sensitive layer 921, the second heat-sensitive layer 922, and the third heat-sensitive layer 923 are arranged in corresponding order from a side close to the heat-generating elements during printing. When the heat-generating elements heat the heat-sensitive layer 92, a temperature gradient in which the first heat-sensitive layer 921 side is high and the third heat-sensitive layer 923 side is low occurs among the first heat-sensitive layer 921, the second heat-sensitive layer 922, and the third heat-sensitive layer 923.

Figure 4:
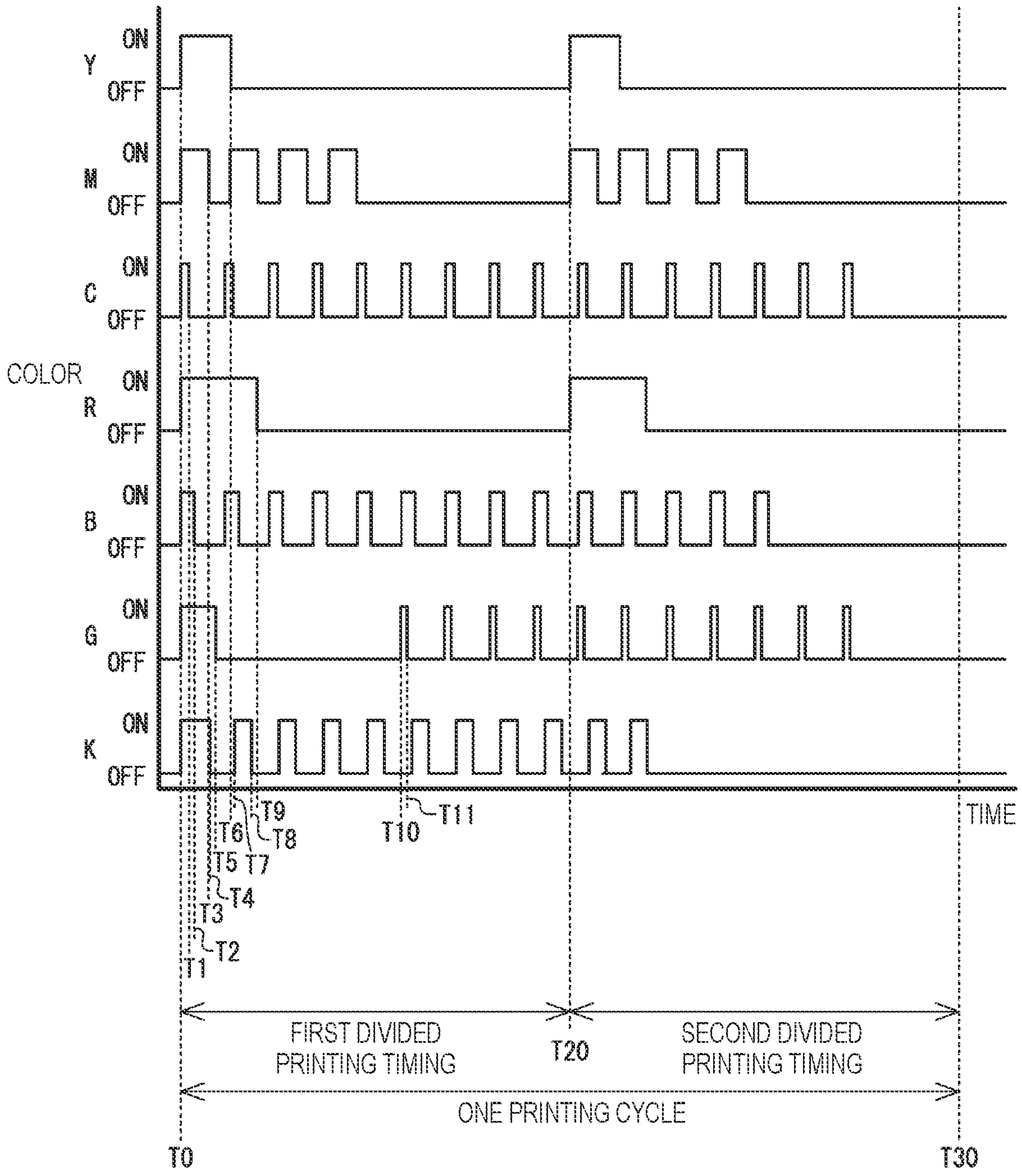
FIG. 4 is a timing chart showing an example of an energization pattern for a heat-generating element.

The energization pattern table is a table in which a relationship among a color, an energization timing, and an energization time in one printing cycle are mapped as an energization pattern, and is stored in the ROM 22. FIG. 4 is a timing chart showing the energization pattern table for illustration. While conveying the heat-sensitive tape 9 in the conveying direction, the printing apparatus 1 heats the heat-sensitive tape 9 by the heat-generating elements aligned in a row of the thermal heads 5 to form print dots row by row. The printing cycle is a period of time during which print dots of one row are formed by the heat-generating elements while the heat-sensitive tape 9 is conveyed in the conveying direction. The printing apparatus 1 heats the heat-sensitive tape 9 by the heat-generating elements according to an energization pattern at every printing cycle when forming a plurality of rows of print dots.

In a yellow (Y) energization pattern, the energization state continues after the energization is started (ON) at T0 until the energization is stopped (OFF) at T6. When the heat-sensitive layer 92 is heated to a temperature higher than the first temperature by the heat applied by the heat-generating elements and maintained at the temperature higher than the first temperature for the first time or longer, the first heat-sensitive layer 921 develops the color of yellow. The heat applied by the heat-generating elements heats the second heat-sensitive layer 922. Even though the second heat-sensitive layer 922 is heated to a temperature higher than the second temperature, the second heat-sensitive layer 922 does not develop a color if the heating time at that temperature is shorter than a second time longer than the first time. The heat applied by the heat-generating elements further heats the third heat-sensitive layer 923. Even though the third heat-sensitive layer 923 is heated to a temperature higher than the third temperature, the third heat-sensitive layer 923 does not develop a color if the heating time at that temperature is shorter than a third time longer than the second time. If the energization is continued as it is, the heating time at the first temperature for the heat-sensitive layer 92 exceeds the second time, but ends at T6 before reaching the second time. Therefore, in the heat-sensitive layer 92, only the yellow of the first heat-sensitive layer 921 is developed by the energization according to the Y energization pattern.

When the heating at the temperature higher than the first temperature is continued for the second time or longer, the second heat-sensitive layer 922 and the third heat-sensitive layer 923 develop colors. Since the thermal head 5 forms print dots on the heat-sensitive tape 9 being conveyed, the yellow print dot formed by the heating at the first temperature for a time equal to or longer than the first time and shorter than the second time are formed short in the conveying direction. If printing is finished as it is, a reproduction range of the yellow print dot will be smaller than those of print dots of the other colors. Therefore, in the present embodiment, the energization pattern for forming yellow print dot applies a multi-dot forming signal pattern in which one printing cycle is divided into N (two, in the present embodiment) divided printing cycles, and a yellow print dot is formed in each of the divided printing cycles.

Figure 5:
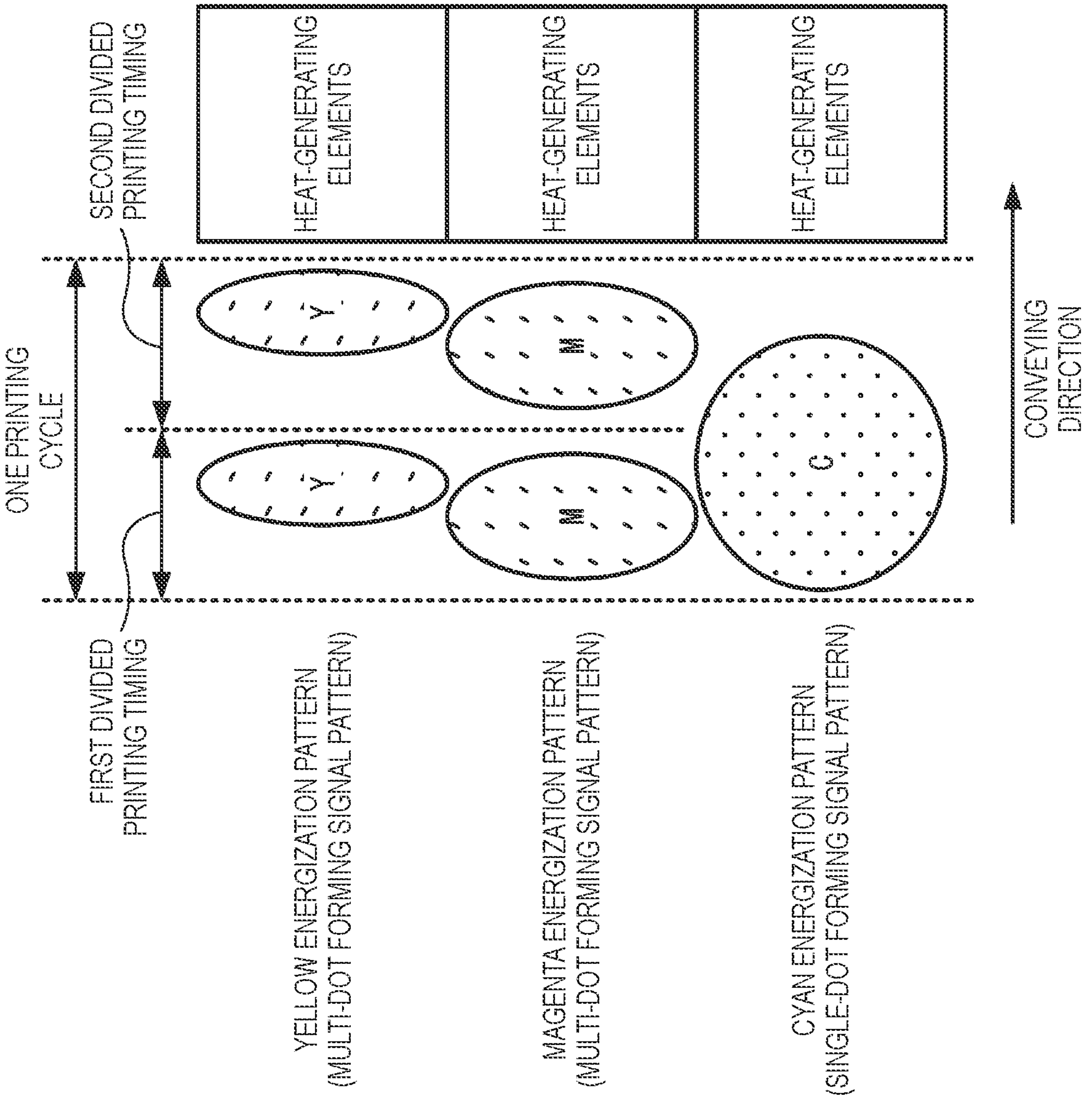
FIG. 5 is a diagram for comparing sizes of printed print dots.

That is, as shown in FIG. 4, in the yellow energization pattern, one printing cycle ranging from T0 to T30 is divided into a first divided printing cycle ranging from T0 to T20 and a second divided printing cycle ranging from T20 to T30, which are each a half of the one printing cycle, and in the first divided printing cycle, the energization to the heat-generating elements is performed from T0 to T6. Then, in the second divided printing cycle, energization to the heat-generating elements is started (ON) at T20, and the energization is stopped (OFF) after performing the energization for the same time as the time ranging from T0 to T6. As shown in FIG. 5, the heat-generating elements can form yellow print dots in the first divided printing cycle and in the second divided printing cycle by the yellow energization pattern to which the multi-dot forming signal pattern is applied.

As shown in FIG. 4, in a magenta (M) energization pattern, after energization is started at T0, the energization is stopped at T3 before T6, and then the energization for the same period with the term T0 to T3 is repeated three times at regular intervals. By chopper control in which the short-period energization ranging from T0 to T3 is repeated, the heat-generating elements heat the heat-sensitive layer 92 to a temperature higher than the second temperature and equal to or lower than the first temperature, and maintains the state for the second time or longer. This causes the second heat-sensitive layer 922 to develop a color of magenta. The heat-generating elements heat the first heat-sensitive layer 921, but the first heat-sensitive layer 921 does not develop a color because the first heat-sensitive layer is maintained at the first temperature or lower. In addition, the heat-generating elements also heat the third heat-sensitive layer 923, but the third heat-sensitive layer 923 does not develop a color because the heating time at the temperature higher than the third temperature is shorter than the third time. Therefore, in the heat-sensitive layer 92, only magenta of the second heat-sensitive layer 922 is developed by the energization according to the M energization pattern.

In the magenta energization pattern, similarly to the yellow energization pattern, the multi-dot forming signal pattern is applied. That is, in the magenta energization pattern, one printing cycle is divided into two, and in the first divided printing cycle, the energization to the heat-generating elements is performed four times from T0 for the same time as the time ranging from T0 to T3 by chopper control. Then, also in the second divided printing cycle, the energization to the heat-generating elements is performed four times from T20 for the same time as the time ranging from T0 to T3 by chopper control. As shown in FIG. 5, the heat-generating elements can form magenta print dots in the first divided printing cycle and in the second divided printing cycle by the magenta energization pattern to which the multi-dot forming signal pattern is applied.

As shown in FIG. 4, in a cyan (C) energization pattern, after energization is started at T0, the energization is stopped at T1 before T3, and then, the energization for the same time as the time T0 to T1 is repeated 15 times at regular intervals. Each energization interval is longer than that of the M energization pattern. The temperature of the heat-sensitive layer 92 is maintained at a temperature higher than the third temperature and equal to or lower than the second temperature for the third time or longer by chopper control in which energization for an extremely short time shorter than that of the M energization pattern is repeated multiple times. This causes the third heat-sensitive layer 923 to develop a color of cyan. The heat-generating elements heat the first heat-sensitive layer 921 and the second heat-sensitive layer 922, but the first heat-sensitive layer 921 and the second heat-sensitive layer 922 do not develop colors because they are maintained at the second temperature or lower. Therefore, in the heat-sensitive layer 92, only cyan of the third heat-sensitive layer 923 is developed by the energization according to the C energization pattern.

In the cyan energization pattern, a single-dot forming signal pattern is applied. That is, in the cyan energization pattern, a single print dot is formed by performing energization 16 times for the same time as the time ranging from T0 to T1 in one printing cycle. As shown in FIG. 5, the heat-generating elements can form one print dot whose reproduction range is larger than one yellow print dot by the cyan energization pattern to which the single-dot forming signal pattern is applied.

The heat-sensitive layer 92 can develop a mixed color by developing colors in two or more of the three layers. The heat-sensitive layer 92 develops red (hereinafter, abbreviated as "R"), which is a mixed color of Y and M, green (hereinafter, abbreviated as "G"), a mixed color of C and Y, and blue (hereinafter, abbreviated as "B"), which is a mixed color of C and M, and black (hereinafter, abbreviated as "K"), which is a mixed color of C, M and Y.

As shown in FIG. 4, in a red (R) energization pattern, after energization is started at T0, the energization is performed for a time ranging from T0 to T9, which is longer than the energization time ranging from T0 to T6 in the Y energization pattern. A temperature change of the heat-sensitive layer 92 due to the heating of the heat-generating elements is omitted, but the heat-sensitive layer 92 is maintained at a temperature exceeding the first temperature for the second time or longer. This causes the first heat-sensitive layer 921 to develop the color of yellow and the second heat-sensitive layer 922 to develop the color of magenta. The heat-generating elements also heat the third heat-sensitive layer 923, but the third heat-sensitive layer 923 does not develop a color because the heating time is shorter than the third time even though the temperature is higher than the third temperature. For this reason, the heat-sensitive layer 92 develops yellow of the first heat-sensitive layer 921 and magenta of the second heat-sensitive layer 922 by the energization according to the R energization pattern, thereby exhibiting red as a mixed color.

In the red energization pattern, similarly to the yellow energization pattern, the multi-dot forming signal pattern is applied. That is, in the magenta energization pattern, one printing cycle is divided into two, and in the first divided printing cycle, the energization to the heat-generating elements is performed from T0 for a time ranging from T0 to T9. Then, also in the second divided printing cycle, the energization to the heat-generating elements is performed from T20 for the time ranging from T0 to T9. Although not shown, by the red energization pattern to which the multi-dot forming signal pattern is applied, the heat-generating elements can form yellow and magenta print dots in an overlapping state in the thickness direction of the heat-sensitive tape 9 in each of the first divided printing cycle and the second divided printing cycle.

In a blue (B) energization pattern, the energization for a time ranging from T0 to T2, which is slightly longer than the energization time T0 to T1 in the C energization pattern, is repeated 14 times at regular intervals. The temperature change of the heat-sensitive layer 92 due to the heating of the heat-generating elements is omitted, but the heat-sensitive layer 92 is maintained at a temperature exceeding the second temperature but equal to or lower than the first temperature for the third time or longer. This causes the second heat-sensitive layer 922 to develop the color of magenta and the third heat-sensitive layer 923 to develop the color of cyan. The heat-generating elements also heat the first heat-sensitive layer 921, but the first heat-sensitive layer 921 does not develop a color because the first heat-sensitive layer is maintained at the first temperature or lower. For this reason, the heat-sensitive layer 92 develops magenta of the second heat-sensitive layer 922 and cyan of the third heat-sensitive layer 923 by the energization according to the B energization pattern, thereby exhibiting blue as a mixed color.

In the blue energization pattern, similarly to the cyan energization pattern, the single-dot forming signal pattern is applied. That is, in the blue energization pattern, a single print dot is formed by performing energization 14 times for the same time as the time ranging from T0 to T2 in one printing cycle. Although not shown, by the cyan energization pattern to which the single-dot forming signal pattern is applied, the heat-generating elements can form one magenta print dot and one cyan print dot, which each have a reproduction range larger than the one yellow print dot, in an overlapping state in the thickness direction of the heat-sensitive tape 9.

In a green (G) energization pattern, after energization is started at T0, the energization is performed for a time ranging from T0 to T5, which is slightly shorter than the energization time ranging from T0 to T6 in the Y energization pattern. Thereafter, from T5 to T10, the energization to the heat-generating elements is not performed and the temperature of the heat-sensitive layer 92 is dropped. Then, from T10, the energization for a time ranging from T10 to T11, which is an extremely short time similar to that of the C energization pattern, is repeated 11 times at regular intervals.

The temperature change of the heat-sensitive layer 92 due to the heating of the heat-generating elements is omitted, but the heat-sensitive layer 92 is maintained at a temperature exceeding the first temperature for the first time or longer by the energization for the time ranging from T0 to T5. This causes the first heat-sensitive layer 921 to develop the color of yellow. The second heat-sensitive layer 922 and the third heat-sensitive layer 923 do not develop colors. From T5 to T10, the energization to the heat-generating elements is not performed, and the temperature of the heat-sensitive layer 92 is dropped to the third temperature or lower. Then, by chopper control in which energization for an extremely short time ranging from T10 to T11 is repeated from T10, the heat-generating elements heat the temperature of the heat-sensitive layer 92 to a temperature higher than the third temperature and equal to or lower than the second temperature, and maintains the state for the third time or longer. This causes the third heat-sensitive layer 923 to develop a color of cyan. During this energization, the second heat-sensitive layer 922 does not develop a color. For this reason, the heat-sensitive layer 92 develops yellow of the first heat-sensitive layer 921 and cyan of the third heat-sensitive layer 923 by the energization according to the G energization pattern, thereby exhibiting green as a mixed color.

In a black (K) energization pattern, after energization is started at T0, the energization is performed for a time ranging from T0 to T6, which is slightly longer than the energization time ranging from T0 to T3 in the M energization pattern. Thereafter, after a slight delay, the energization for a time ranging from T7 to T8, which is shorter than the time ranging from T0 to T6, is repeated 10 times at regular intervals.

The temperature change of the heat-sensitive layer 92 due to the heating of the heat-sensitive elements is omitted, but the heat-sensitive elements heat the heat-sensitive layer 92 to a temperature higher than the first temperature and maintain the state at that temperature for the third time or longer by chopper control in which energization for a time ranging from T0 to T6 and energization for a time ranging from T7 to T8 are repeated 10 times. Thereby, in each of the first heat-sensitive layer 921, the second heat-sensitive layer 922, and the third heat-sensitive layer 923, yellow, magenta, and cyan are developed, and black is exhibited as a mixed color.

An energization pattern other than the above patterns may also be provided. For example, a pattern in which cyan is first developed, or a pattern in which the energization start timing is delayed from T0 may be provided, as the black energization pattern.

Next, label preparation processing by the printing apparatus 1 will be described. The user operates an external terminal to transmit a print start instruction to the printing apparatus 1. When the print start instruction is acquired, the CPU 21 reads out a program from the flash memory 24 and executes label preparation processing. In the label preparation processing, a printing operation by the printing apparatus 1 is controlled, and a label is prepared from the printed heat-sensitive tape 9.

Figure 6:
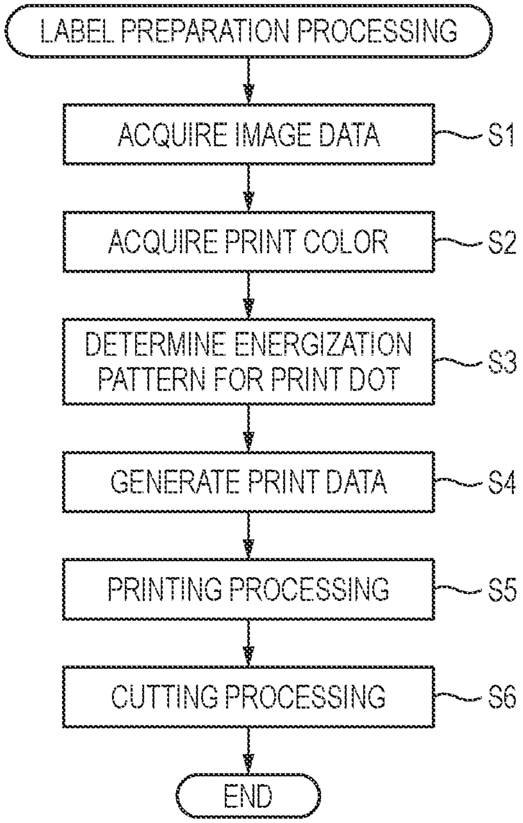
FIG. 6 is a flowchart of label preparation processing.

As shown in FIG. 6, the CPU 21 acquires image data representing an image designated by the user (S1). The image data is acquired from the user's external terminal via a network. Note that the image data may also be data read in advance from the external terminal and stored in the flash memory 24.

The CPU 21 executes print color acquisition processing (S2). The print color acquisition processing is processing of acquiring a color of each pixel from the image data and converting the same into a color of a dot to be developed by the printing apparatus 1. The printing apparatus 1 causes the heat-sensitive layer 92 to develop respective colors of cyan, magenta, and yellow, and can further express respective colors of red, green, blue, and black, as mixed colors. The CPU 21 decomposes the color of each pixel of the image data, and performs color conversion for expressing each color described above.

Based on the energization pattern table (refer to FIG. 4), the CPU 21 determines an energization pattern for each print dot subjected to the color conversion in S2 (S3). When colors of prints dots are Y, M and R, the CPU 21 determines each of the Y, M and R energization patterns, which are classified as the multi-dot forming signal pattern, from the energization pattern table. When colors of print dots are C, B, G and K, the CPU 21 determines each of the C, B, G and K energization patterns, which are classified as the single-dot forming signal pattern, from the energization pattern table.

The CPU 21 prepares a command for controlling energization to the heat-generating elements corresponding to each print dot, based on the energization pattern for each print dot, according to a predetermined format, and generates print data (S4).

The CPU 21 controls the thermal head 5 while controlling the conveying motor 6. The platen roller is rotationally driven to take out the heat-sensitive tape 9 from the cassette and to convey the same in the conveying direction. The CPU 21 executes each command of print data while conveying the heat-sensitive tape 9, and causes the plurality of heat-generating elements to selectively generate heat. The heat-sensitive layer 92 of the heat-sensitive tape 9 is heated by the plurality of heat-generating elements of the thermal head 5 according to the corresponding energization pattern for each printing cycle. Thereby, the heat-sensitive layer 92 develops colors to form print dots, so that an image based on the image data is printed on the heat-sensitive tape 9 (S5).

When the printing processing according to the print data is completed, the CPU 21 drives the cutting blade to cut the heat-sensitive tape 9 by controlling the cutting motor 7 (S6). The printing apparatus 1 discharges the printed label from the discharge port 3. The CPU 21 ends the label preparation processing.

As described above, the printing apparatus 1 can form a plurality (N) of print dots in one printing cycle according to the multi-dot forming signal pattern. That is, even though a single print dot is small, the printing apparatus 1 can secure a sufficiently large reproduction range of a print dot by forming a plurality of print dots within a range in which a print dot can be formed in one printing cycle.

The heat-sensitive tape 9 has the plurality of heat-sensitive layers 92, each having a different color development temperature and a different heating time. The printing apparatus 1 can form print dots of different colors on the heat-sensitive tape 9 by applying the energy to the heat-generating elements according to the multi-dot forming signal pattern and the single-dot forming signal pattern.

When causing the first heat-sensitive layer 921 singly to develop the color of yellow without causing the second heat-sensitive layer 922 to develop a color, the printing apparatus 1 is required to maintain the heating of the heat-sensitive tape 9 at the temperature higher than the first temperature for a time equal to or longer than the first time and shorter than the second time while conveying the heat-sensitive tape 9. For this reason, it is difficult to form a large yellow print dot. In this case, the printing apparatus 1 forms a plurality of yellow print dots according to the multi-dot forming signal pattern in one printing cycle. For this reason, even though one print dot is small, the printing apparatus 1 can secure a sufficiently large yellow reproduction range by forming the plurality of print dots. Similarly, the multi-dot forming signal pattern can also be applied to the energization pattern when causing the second heat-sensitive layer 922 singly to develop the color of magenta.

The heat-sensitive tape 9 includes the three heat-sensitive layers 92 capable of developing colors of yellow, magenta, and cyan, respectively. The printing apparatus 1 can perform more colorful expressions on the heat-sensitive tape 9 by combining the three colors. In this case, by using the multi-dot forming signal pattern or the single-dot forming signal pattern, the printing apparatus 1 can easily control the heating for each heat-sensitive layer 92, and form print dots developed into appropriate colors on the heat-sensitive tape 9.

Yellow and magenta develop colors in a shorter time than cyan. Therefore, by using the multi-dot forming signal pattern, the printing apparatus 1 can cause the target heat-sensitive layer 92 singly to develop a color, and form yellow, magenta, and red print dots, for which sufficiently large color reproduction ranges are secured, on the heat-sensitive tape 9.

In the above embodiment, the left-right direction of the printing apparatus 1 corresponds to the "serial direction" of the present disclosure. The heat-sensitive tape 9 corresponds to the "print medium" of the present disclosure. The conveying motor 6 and the platen roller correspond to the "conveyor" of the present disclosure. The CPU 21 corresponds to the "processor" of the present disclosure. The energization state (ON) and the non-energization state (OFF) in the energization pattern correspond to "application information" and "non-application information" of the present disclosure. The heat-sensitive layer 92 corresponds to the "color development layer" of the present disclosure. The first heat-sensitive layer 921, the second heat-sensitive layer 922, and the third heat-sensitive layer 923 correspond to the "first color development layer", "second color development layer", and "third color development layer" of the present disclosure, respectively. Yellow, magenta, and cyan are examples of the "first color", "second color", and "third color" of the present disclosure, respectively.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. For example, the energization pattern table is not limited to the C, M, Y, R, G, B, and K energization patterns described above, and may have more patterns by further subdividing. The heat-sensitive layer 92 may be configured by two layers or may be configured by four or more layers. In addition, the color of each layer is not limited to C, M, and Y, but may be R, G, B, K, or another color. Further, the same color of different depths may be set as the color of each layer. Note that, when the heat-sensitive layer 92 is configured by four layers, the fourth color is preferably K.

In the present embodiment, the multi-dot forming signal pattern is an energization pattern in which one printing cycle is divided into two, i.e., the first divided printing cycle and the second divided printing cycle, and a print dot is formed in each divided printing cycle. However, the present invention is not limited thereto, and an energization pattern is also possible in which one printing cycle is divided into three or more divided printing cycles, and a print dot is formed in each divided printing cycle. Note that the number of divisions of one printing cycle is only necessary to be a natural number.

In the multi-dot forming signal pattern, the first divided printing cycle and the second divided printing cycle may be configured with different energization patterns. For example, in the case of the yellow energization pattern, the CPU 21 performs energization from T0 for a time ranging from T0 to T6 in the first divided printing cycle, and performs energization from T20 for a time ranging from T0 to T6 also in the second divided printing cycle. However, the CPU 21 may shorten the energization time in the second divided printing cycle to be shorter than the time ranging from T0 to T6 as long as it is possible to apply, to the heat-generating elements, an amount of energy capable of maintaining a temperature exceeding the first temperature for the first time or longer. When forming a plurality of print dots according to the multi-dot forming signal pattern, the thermal head 5 is more affected by heat storage in the heat-generating elements as the number of divided printing cycles increases (as N increases). In this case, the thermal head 5 may apply a more amount of heat than necessary to the heat-sensitive tape 9 in the second divided printing cycle, and therefore, a color tone of the print dot may change. Therefore, in the multi-dot forming signal pattern, a print dot forming pattern in the first divided printing cycle and a print dot forming pattern in the second divided printing cycle are made different, so that the printing apparatus 1 can improve a color tone of the print dot. A program for performing the processing of S1 to S4 of the label preparation processing may be installed and executed as a printer driver in the external terminal. In this case, the printing apparatus 1 may acquire print data from the external terminal, form print dots on the heat-sensitive tape 9 according to the print data, and generate a label.

What is claimed is:

1. A printing apparatus comprising:

a thermal head having a plurality of heat-generating elements aligned in a line form;

a conveyor configured to convey a print medium in a conveying direction orthogonal to a serial direction in which the plurality of heat-generating elements are aligned in the thermal head, the printing apparatus being configured to form print dots on the print medium conveyed by the conveyor; and a processor configured to:

generate a signal pattern for causing the plurality of heat-generating elements to selectively generate heat based on image data; and control an application of energy to the heat-generating elements according to the signal pattern, for each printing cycle that is repeated continuously, wherein the signal pattern is configured by a pattern in which application information of indicating a period for applying energy to the heat-generating elements and non-application information of indicating a period not for applying energy to the heat-generating elements are combined, and wherein the processor is configured to generate the signal pattern by a combination of:

a multi-dot forming signal pattern including a pattern in which one printing cycle is divided into a plurality of divided printing cycles, and a print dot is formed by a combination of the application information and the non-application information in each of the divided printing cycles; and a single-dot forming signal pattern that is a pattern in which a single print dot is formed by a combination of the application information and the non-application information within one printing cycle, without dividing the one printing cycle.

2. The printing apparatus according to claim 1, wherein the multi-dot forming signal pattern includes:

a first pattern by a combination of the application information and the non-application information in a first divided printing cycle that is one of the plurality of divided printing cycles; and a second pattern by a combination of the application information and the non-application information in a second divided printing cycle subsequent to the first divided printing cycle, and wherein alignments of the application information are different between the first pattern and the second pattern.

3. The printing apparatus according to claim 1, wherein a first amount of energy applied to the heat-generating elements according to the multi-dot forming signal pattern is different from a second energy applied to the heat-generating elements according to the single-dot forming signal pattern, and wherein a color of a print dot formed on the print medium due to the first amount of energy is different from a color of a print dot formed on the print medium due to the second amount of energy.

4. The printing apparatus according to claim 3, wherein the print medium comprises:

a base material; and a plurality of color development layers having visible light transmittance, wherein the plurality of color development layers include:

a first color development layer provided on one side in a thickness direction of the base material and configured to develop a first color by being heated to a temperature exceeding a predetermined first temperature; and a second color development layer provided between the base material and the first color development layer and configured to develop a second color by being heated to a temperature exceeding a second temperature lower than the first temperature, wherein the thermal head is configured to perform printing on the print medium from the one side in the thickness direction, and wherein the multi-dot forming signal pattern is used in a case of forming print dots of the first color by causing at least the first color development layer singly to develop a color.

5. The printing apparatus according to claim 4, wherein the plurality of color development layers further include a third color development layer provided between the base material and the second color development layer and configured to develop a third color by being heated to a temperature exceeding a third temperature lower than the second temperature.

6. The printing apparatus according to claim 5, wherein the first color is yellow, the second color is magenta, and the third color is cyan, and wherein the multi-dot forming signal pattern is used in a case of forming print dots of yellow, print dots of magenta, or print dots of red being a mixed color of yellow and magenta.

7. A printing method of, in a printing apparatus printing apparatus comprising a thermal head having a plurality of heat-generating elements aligned in a line form, and a conveyor configured to convey a print medium in a conveying direction orthogonal to a serial direction in which the plurality of heat-generating elements are aligned in the thermal head, forming print dots on the print medium conveyed by the conveyor, the printing method comprising the steps of:

generating a signal pattern for causing the plurality of heat-generating elements to selectively generate heat based on image data; and controlling an application of energy to the heat-generating elements according to the signal pattern, for each printing cycle that is repeated continuously, to form print dots on the print medium, wherein the signal pattern is configured by a pattern in which application information of indicating a period for applying energy to the heat-generating elements and non-application information of indicating a period not for applying energy to the heat-generating elements are combined, and wherein the signal pattern is configured by a combination of:

a multi-dot forming signal pattern including a pattern in which one printing cycle is divided into a plurality of divided printing cycles, and a print dot is formed by a combination of the application information and the non-application information in each of the divided printing cycles; and a single-dot forming signal pattern that is a pattern in which a single print dot is formed by a combination of the application information and the non-application information within one printing cycle, without dividing the one printing cycle.

8. A non-transitory computer-readable storage medium storing a printing program executable by a computer of a printing apparatus that comprises a thermal head having a plurality of heat-generating elements aligned in a line form, and a conveyor configured to convey a print medium in a conveying direction orthogonal to a serial direction in which the plurality of heat-generating elements are aligned in the thermal head, the printing apparatus being configured to form print dots on the print medium conveyed by the conveyor, the printing program comprising instructions that, when executed by the computer, cause the printing apparatus to perform:

generating a signal pattern for causing the plurality of heat-generating elements to selectively generate heat based on image data; and controlling an application of energy to the heat-generating elements according to the signal pattern, for each printing cycle that is repeated continuously, to form print dots on the print medium, wherein the signal pattern is configured by a pattern in which application information of indicating a period for applying energy to the heat-generating elements and non-application information of indicating a period not for applying energy to the heat-generating elements are combined, and wherein the signal pattern is configured by a combination of:

a multi-dot forming signal pattern including a pattern in which one printing cycle is divided into a plurality of divided printing cycles, and a print dot is formed by a combination of the application information and the non-application information in each of the divided printing cycles; and a single-dot forming signal pattern that is a pattern in which a single print dot is formed by a combination of the application information and the non-application information within one printing cycle, without dividing the one printing cycle.

* * * * *